(12) United States Patent
Kim

(10) Patent No.: US 7,245,411 B2
(45) Date of Patent: Jul. 17, 2007

(54) COLLIMATING LENS WITH TEMPERATURE COMPENSATION AND AN OPTICAL SCANNING APPARATUS USING THE SAME

(75) Inventor: Hyung-soo Kim, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/516,511

(22) Filed: Sep. 7, 2006

(65) Prior Publication Data

US 2007/0002418 A1    Jan. 4, 2007

(51) Int. Cl.
*G02B 26/08*    (2006.01)
(52) U.S. Cl. ...................... 359/206; 359/641
(58) Field of Classification Search ............ None
See application file for complete search history.

(56) References Cited

U.S. PATENT DOCUMENTS 5,410,563 A * 4/1995 Nakamura et al. .......... 372/101
6,094,286 A * 7/2000 Kato ........................... 359/206
6,101,020 A * 8/2000 Ori ............................. 359/205

OTHER PUBLICATIONS

Patent Abstract of Japanese Published Application No. 2002-006211, published Sep. 1, 2002.

* cited by examiner

*Primary Examiner*—James Phan
(74) *Attorney, Agent, or Firm*—Staas & Halsey LLP

(57) ABSTRACT

A temperature-compensated collimating lens provided of a single piece of lens, which does not have variation in its focal distance due to temperature changes, and an optical scanning apparatus using the same. The collimating lens to transform a ray of light from a light source into approximate parallel rays. The collimating lens is provided a single lens of plastic, and the single lens has a refraction surface provided on one side and a diffraction surface provided on the other side. The refraction surface and the diffraction surface have predetermined powers to prevent power of the collimating lens from changing due to change in temperature. The refraction surface and the diffraction surface have a power to satisfy the condition of, $$-3 \leq \frac{K_d}{K_r} \leq -2.$$

5 Claims, 3 Drawing Sheets

COLLIMATING LENS WITH TEMPERATURE COMPENSATION AND AN OPTICAL SCANNING APPARATUS USING THE SAME

CROSS-REFERENCE TO RELATED APPLICATIONS

This application is related to and claims the benefit of Korean Application No. 2002-64351, filed Oct. 21, 2002, in the Korean Intellectual Property Office, and U.S. application Ser. No. 10/659,434, filed Sep. 11, 2003, in the United States Patent and Trademark Office.

BACKGROUND OF THE INVENTION

1. Field of the Invention

An aspect of the present invention relates to an optical scanning apparatus for use in image formation in an image forming apparatus such as a laser printer, and more particularly, to a collimating lens, which compensates for a change in temperature during use, and thus, causes no variation of focal distance, and an optical scanning apparatus using the same.

2. Description of the Related Art

Generally, an image forming apparatus such as a laser printer or a digital copier uses an optical scanning apparatus to form an image on a photosensitive medium. Accordingly, a light is emitted from a light source in accordance with image signals, and modulated as it passes through a collimating lens and a cylindrical lens to be periodically deflected on the light deflector such as a rotatable polygon mirror. An image is recorded as the deflective light from the light deflector is focused on the surface of the photosensitive medium through an fθ lens in the form of a spot.

With the ongoing development in the field of the image forming apparatus, such as printers, an optical scanning apparatus having a smaller F-number or spot size has been in increasing demand. Accordingly, an optical system having a smaller F-number has been developed. However, an optical system with the small F-number is accompanied by problems, such as reduction in depth of focus, which subsequently causes spot size on the surface of the photosensitive medium to vary with the changes in temperature.

Some suggestions to solve the above problems have been made, including: properly combining materials for the collimating lens and the lens barrel, properly distributing material and power for the plurality of lenses of the collimating lens and employing diffraction elements.

However, adjusting the material for the lens and the lens barrel has resulted in mechanical limitations, and the use of diffraction elements has not been provided with practical designs and fabricating methods thus far.

A method of properly distributing material and power for the collimating lenses is disclosed in Japanese Patent Publication No. 2002-6211, which comprises a temperature-compensating lens and an optical apparatus using the same.

FIG. 1 illustrates a light source unit of an optical scanning apparatus using the temperature compensating lens of JP 2002-6211.

Referring to FIG. 1, the light source unit includes a light source 10, a collimator lens 20, a diaphragm 30, and a housing 40.

The light source 10 emits a ray of light with the reception of electricity thereto, of which a laser diode is a typical example thereof.

The collimator lens 20 includes at least one piece of positive lens and at least one piece of negative lens, with more than two pieces of lenses being made of different materials. In the order from the end of the collimator lens 20 where the light is emitted, with an index of refraction of ith lens material being $n_i$, variation of $n_i$ with respect to temperature rise dt being $dn_i/dt(1/°C.)$, and power of the ith lens being $\phi_i(1/mm)$, the inequality 1 is satisfied.

$$\sum_{i=1}^{m} \frac{\phi_i}{(n_1-1)} \frac{dn_i}{dt} \leq 0 \qquad \text{Inequality 1}$$

With the collimating lens 20 satisfying the inequality 1, a focal point is easily compensated because expansion of the positive and the negative lenses offset each other.

However, according to the above-described patent publication, the collimating lens 20 requires at least two glass lenses, preferably four glass lenses, which have different indices of diffraction as an essential feature. Accordingly, since there are a number of parts required, the weight of the apparatus also becomes heavier. As a result, the cost of manufacturing as well as the assembling process increases.

Consequently, there have been increasing demands for a collimating lens in which a focal point is compensated in response to the rise of ambient temperature.

SUMMARY OF THE INVENTION

Accordingly, it is an aspect of the present invention to provide a collimating lens in which focal distance is not varied even when the ambient temperature changes.

It is another aspect of the present invention to provide a collimating lens with which an optical scanning apparatus can be fabricated at a reasonable cost.

The foregoing and/or other aspects of the present invention are achieved by providing, a collimating lens to transform a ray of light from a light source into parallel rays, the collimating lens provided of a single lens of plastic, the single lens having a refraction surface provided on one side and a diffraction surface provided on the other side, and the refraction surface and the diffraction surface having predetermined powers to prevent power of the collimating lens from changing as a result of a change in temperature.

Additional aspects and advantages of the invention will be set forth in part in the description which follows and, in part, will be obvious from the description, or may be learned by practice of the invention.

The collimating lens and the diffraction surface of the collimating lens have a positive power.

The refraction surface and the diffraction surface have the power to satisfy a condition of:

$$-3 \leq \frac{K_d}{K_r} \leq -2$$

where, $K_d$ is a power of the diffraction surface, and $K_r$ is a power of the refraction surface.

The refraction surface and the diffraction surface have the powers to satisfy a condition of:

$$\frac{K_d}{K_r} = -\frac{(2n + (n+1)(n^2 + 2))}{4n}$$

where, $K_d$ is a power of the diffraction surface, $K_r$ is a power of the refraction surface, and n is an index of refraction of the material that constitutes the collimating lens.

According to another aspect of the invention, at least the refraction surface and the diffraction surface is provided as a non-spherical surface.

According to another aspect of the present invention, an optical scanning apparatus is provided to project a ray of light from a light source towards a predetermined direction, and to converge the ray of light on a photosensitive medium. The optical scanning apparatus includes a collimating lens to transform the ray of light from the light source into approximately parallel rays, which is provided with a single plastic lens that has a refraction surface provided on one side and a diffraction surface provided on the other side, wherein the refraction surface and the diffraction surface have predetermined powers to prevent power of the collimating lens from changing due to a change in temperature. The optical scanning apparatus comprises, a cylindrical lens to converge a light component from the collimating lens in a sub-scanning direction into an approximately linear ray of light in a main-scanning direction, a light deflector to deflect the ray of light from the cylindrical lens, and an f-θ lens to converge the reflected ray of light from the light deflector onto the photosensitive medium.

In the temperature-compensated collimating lens constructed as above according to an aspect of the present invention, the focal distance of the collimating lens remains constant even when the temperature changes.

Furthermore, since the collimating lens is made of a single piece of plastic lens, the collimating lens is light-weight, and an optical scanning apparatus can be manufactured with less cost.

BRIEF DESCRIPTION OF THE DRAWINGS

The above and/or other aspects and advantages of the invention will become apparent, and more readily appreciated from the following description of the preferred embodiments, taken in conjunction with accompanying drawings of which.

DETAILED DESCRIPTION OF THE PREFERRED EMBODIMENTS

Figure 1:
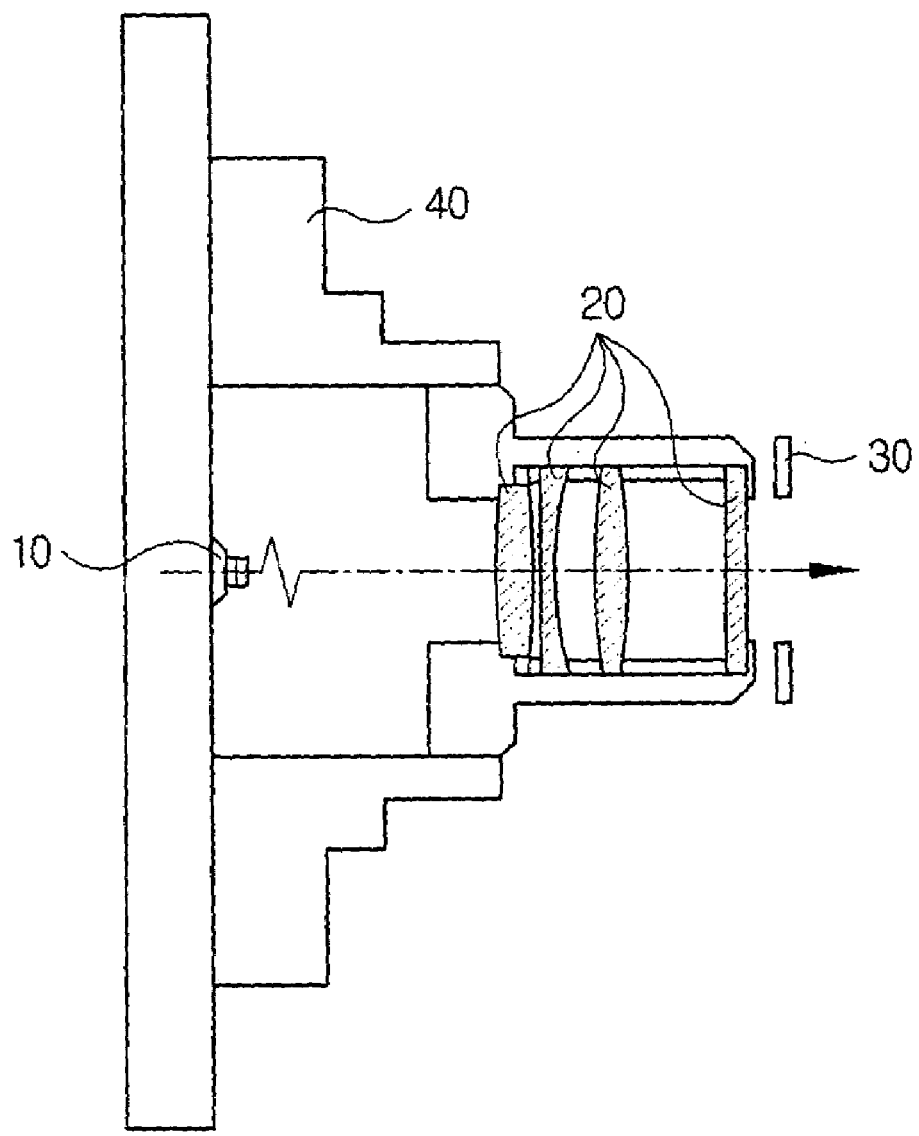
FIG. 1 is a sectional view of a conventional collimating lens.

Reference will now be made in detail to the present preferred embodiments of the present invention, examples of which are illustrated in the accompanying drawings, wherein like reference numerals refer to the like elements throughout.

Figure 2:
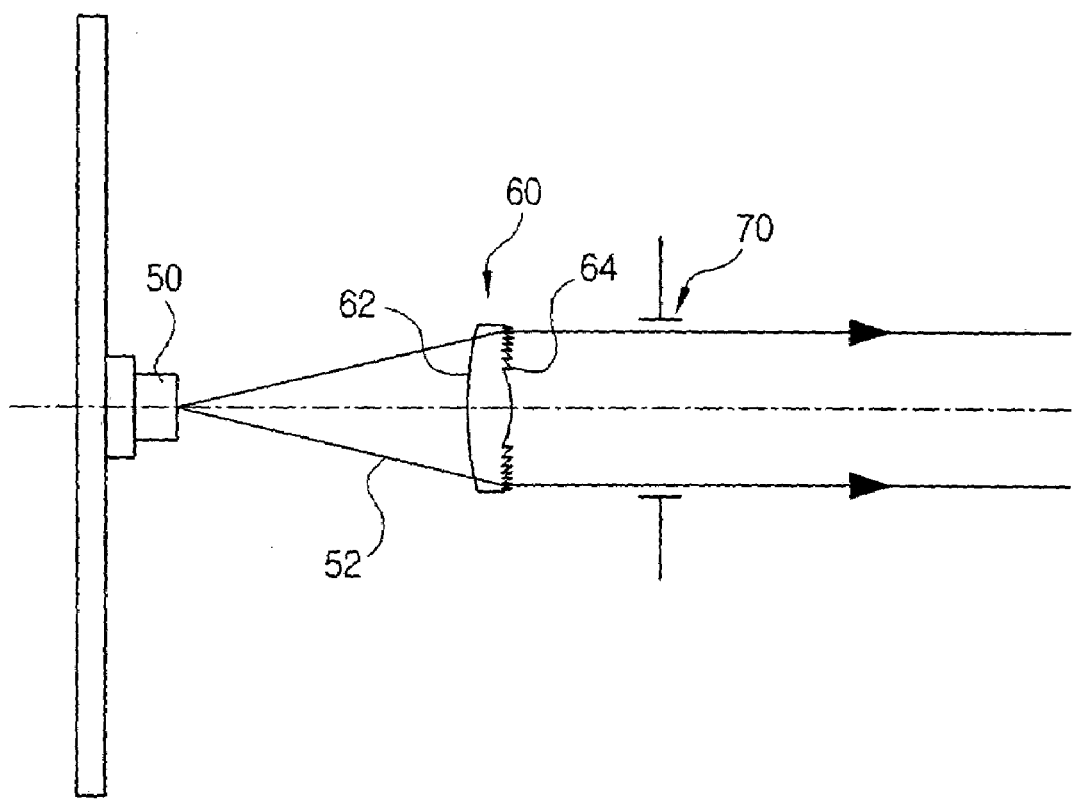
FIG. 2 is a view of an arrangement of a temperature-compensated collimating lens and a light source.

A light source 50 and a collimating lens 60, to transform a ray 52 of light from the light source 50 into approximately parallel ray, are shown in FIG. 2.

Further, a diaphragm 70 is provided which limits the luminosity of the lights converged on the collimating lens 60 or the lights that are transformed into approximate parallel rays.

The collimating lens 60 is made of plastic, and also provided with a single piece of lens, unlike the conventional case which has a combination of more than two lenses. A surface 62 of the collimating lens is shaped as a refraction surface, while the opposite surface 64 is shaped as a diffraction surface. Both of the refraction and diffraction surfaces 62 and 64 may be provided either as spherical or non-spherical.

The refraction and diffraction surfaces 62 and 64 of the collimating lens 60 are shaped such that the power of the respective surfaces 62 and 64 satisfy the following: [inequality 2.]

$$-3 \leq \frac{K_d}{K_r} \leq -2 \qquad \text{Inequality 2}$$

where, $K_d$ is a power of the diffraction surface 64, and $K_r$ is a power of the refraction surface 62. The power refers to an inverse of the focal distance.

The power ratio of the refraction and diffraction surfaces 62 and 64 of the collimating lens 60 according to the inequality 2 can be obtained by the equation 3.

$$\frac{K_d}{K_r} = -\frac{(2n + (n+1)(n^2 + 2))}{4n} \qquad \text{Equation 3}$$

where, $K_d$ is a power of the diffraction surface 64, $K_r$ is a power of the refraction surface 62, and n is an index of refraction of the material that constitutes the collimating lens 60.

The refraction and diffraction surfaces 62 and 64 of the collimating lens 60 can be shaped as either spherical or non-spherical as long as inequality 2 is satisfied. The diffraction surface 64 is shaped mainly by direct mechanical writing that uses a diamond lathe or ruling engine, but may also be shaped by photo resist etching or laser beam writing.

Individual power of, and power ratio between the refraction and diffraction surfaces 62 and 64 of the collimating lens 60 that satisfies the inequality 2 can be listed as follows.

TABLE 1

| | N | d | $K_t$ | $K_r$ | $K_d$ | $K_d/K_r$ |
|---|---|---|---|---|---|---|
| Embodiment 1 | 1.453 | 3.000 | 0.100 | −4.412 | 9.969 | −2.259 |
| Embodiment 2 | 1.523 | 3.000 | 0.100 | −4.312 | 9.869 | −2.289 |

In table 1, d denotes a thickness of the center of the collimating lens 60, $K_t$ is the total power of the collimating lens 60, $K_d$ is the power of the diffraction surface 64, $K_r$ is power of refraction surface 62, and n is the index of refraction of the material that constitutes the collimating lens 60.

With reference to the first and second embodiments illustrated in table 1, it can be noted that, when the collimating lens 60 has the positive power, the diffraction surface 64 has positive power and the power of the diffraction surface 64 is larger than the power of the refraction surface 62 by the difference which is within the range expressed by the inequality 2.

Compensating for a temperature-induced variation in the focal distance of the collimating lens 60, according to an aspect of the present invention, will be described below.

The incident ray of light on the refraction surface 62 of the collimating lens 60 is refracted as it passes through the refraction surface 62, and diffracted as it passes through the diffraction surface 64. If there is a temperature rise around the collimating lens 60, and subsequently the focal distance of the refraction surface 62 varies, such variation is offset by varying the focal point of the diffraction surface 64. As a result, the collimating lens 60 maintains a constant focal distance.

On the other hand, if the light is incident on the diffraction surface 64, the ray of light is diffracted as it passes through the diffraction surface 64, and then refracted as it passes through the refraction surface 62. If focal distance of the diffraction surface 64 varies due to change in temperature around the collimating lens 60, such variation is offset by the varying of focal point of the refraction surface 62, and as a result, the collimating lens 60 maintains a constant focal distance.

Figure 3:
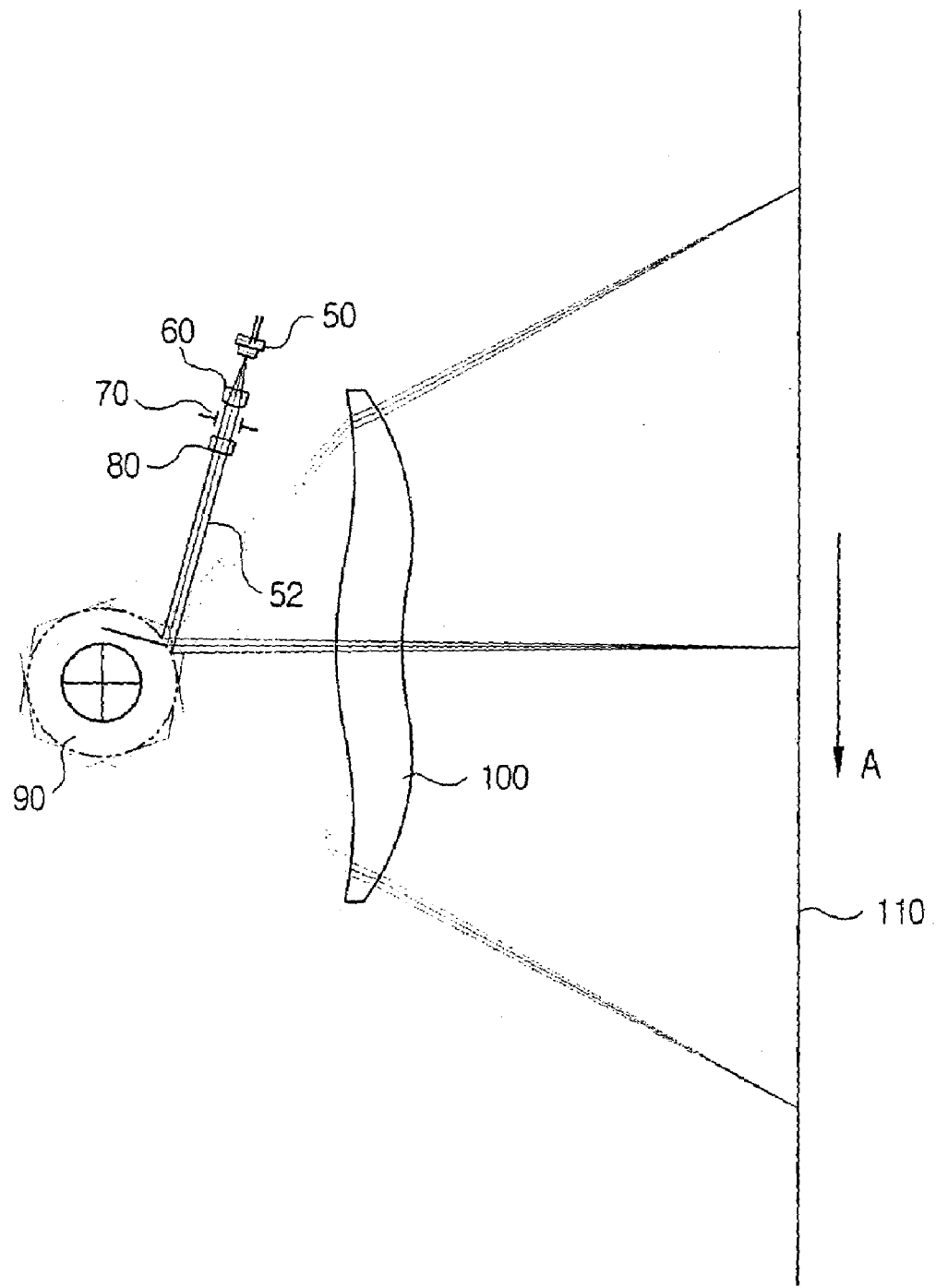
FIG. 3 is a schematic view illustrating main features of an optical scanning apparatus that uses a temperature-compensated collimating lens of FIG. 2.

An optical scanning apparatus using a temperature-compensated collimating lens according to an aspect of the present invention is shown in FIG. 3.

The optical scanning apparatus according to one aspect of the present invention includes a light source 50, a collimating lens 60, a diaphragm 70, a cylindrical lens 80, a light deflector 90, and an f-θ lens 100.

The light source 50 emits ray 52 of light to provide an image on a photosensitive medium. Generally, a semiconductor laser is used as the light source 50.

The collimating lens 60 transforms the ray 52 from the light source 50 into approximate parallel rays, and has a temperature-compensating feature that prevents variation of focal distance with the change of the ambient temperature. The collimating lens 60 with the temperature-compensating feature is provided of a plastic lens that has a refraction surface provided on one side and a diffraction surface provided on the other. The collimating lens 60 satisfies the above inequality 2 and equation 3. According to the present embodiment, the refraction surface of the collimating lens 60 is provided on the side closest to the light source 50. If the refraction surface expands due to ambient temperature changes, thus changes in power, the diffraction surface relatively expands changing in power and offsetting the power variation of the refraction surface. In other words, as the power variation on the refraction surface is offset by the power variation on the diffraction surface, the collimating lens 60 can maintain constant power at all times.

A diaphragm 70, which limits the luminosity of the lights converged on the collimating lens 60 or the lights that are transformed into approximately parallel rays, is provided next to the collimating lens 60.

The cylindrical lens 80 converges the light components from the collimating lens 60 in a sub-scanning direction (i.e., perpendicular direction with respect to a main-scanning direction), thereby generating approximately linear light in the main-scanning direction (arrow A of FIG. 3).

The light deflector 90 deflects the light from the cylindrical lens 80 towards the photosensitive medium at a constant speed. Generally a rotatable polygon mirror that is rotated by a motor at a constant speed is used as the light deflector.

The fθ lens 100 induces the deflected and reflected lights from the deflecting surface of the light deflector 90 towards the photosensitive surface 110. The fθ lens 100 has different refractive powers in the main-scanning and the sub-scanning directions.

Accordingly, an image recording is performed as the rays of light are passed through the fθ lens 100 and converged on the photosensitive surface 110 of the photosensitive medium.

The light scanning operation of the lights scanning apparatus constructed above with respect to the photosensitive surface 110 will be described below.

With the supply of electricity to the light source 50, a ray 52 of light is emitted. The ray 52 is transformed approximately into parallel rays as it passes through the collimating lens 60. The parallel rays are adjusted in luminosity via the diaphragm 70, and then fall incident on the cylindrical lens 80. As the rays are passed through the cylindrical lens 80, the rays in the main-scanning direction are directly emitted, while the rays in the sub-scanning direction are converged on the deflecting surface of the light deflector 90 substantially in the form of a line. The deflected and reflected rays from the deflecting surface of the light deflector 90 are passed through the f-θ lens 100 and converged on the photosensitive surface 110 of the photosensitive medium, thereby forming an image thereon.

Upon change in temperature around the optical scanning apparatus, the collimating lens 60 expands. Even when the collimating lens 60 expands, since the power variation on the refraction surface is offset by the power variation on the diffraction surface, there is no power variation in the collimating lens 60. In other words, the focal distance of the collimating lens 60 does not vary even with the change in temperature, and the optical scanning apparatus can maintain reliable performance at all times.

Furthermore, according to an aspect of the present invention, since the collimating lens 60 is made of plastic lens, the optical scanning apparatus can be compact-size and lightweight. Particularly, since the collimating lens 60 is a single piece of lens, the number of parts required is reduced, and the fabricating process is simplified. Further, the fabricating cost is also reduced.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical scanning apparatus to project a ray of light from a light source towards a predetermined direction and to converge the ray of light on a photosensitive medium, the optical scanning apparatus comprising:

a collimating lens to transform the ray of light from the light source into parallel rays and provided of a single plastic lens that has a refraction surface provided on one side and a diffraction surface provided on an opposite side, where a power of the diffraction surface is larger than a power of the refraction surface;

a cylindrical lens to converge a light component from the collimating lens, in a sub-scanning direction into a linear ray of light in a main-scanning direction;

a light deflector to deflect the linear ray from the cylindrical lens; and an f-θ lens to converge the reflected ray of light from the light deflector onto the photosensitive medium, wherein the refraction surface and the diffraction surface have powers to satisfy the condition of:

$$-3 \leq \frac{K_d}{K_r} \leq -2$$

where, $K_d$ is the power of the diffraction surface, and $K_r$ is the power of the refraction surface.

2. The optical scanning apparatus as claimed in claim 1, wherein the collimating lens and the refraction surface of the collimating lens have a positive power.

3. The collimating lens as claimed in claim 1, wherein at least one of the refraction surface and the diffraction surface is provided as a non-spherical surface.

4. An optical scanning apparatus to project a ray of light from a light source towards a predetermined direction and to converge the ray of light on a photosensitive medium, the optical scanning apparatus comprising:
   a collimating lens to transform the ray of light from the light source into parallel rays and provided of a single plastic lens that has a refraction surface provided on one side and a diffraction surface provided on an opposite side, where a power of the diffraction surface is larger than a power of the refraction surface;
   a cylindrical lens to converge a light component from the collimating lens, in a sub-scanning direction into a linear ray of light in a main-scanning direction;
   a light deflector to deflect the linear ray from the cylindrical lens; and
   an f-θ lens to converge the reflected ray of light from the light deflector onto the photosensitive medium, wherein the refraction surface and the diffraction surface have powers to satisfy a condition of:

$$\frac{K_d}{K_r} = -\frac{(2n + (n+1)(n^2 + 2))}{4n}$$

where, $K_d$ is the power of the diffraction surface, $K_r$ is the power of the refraction surface, and n is an index of refraction of a material that constitutes the collimating lens.

5. An optical scanning apparatus, comprising:
   a light source from which a ray of light is projected via the optical scanning apparatus;
   a collimating lens to modify a ray of light from a light source to cause the ray of light to become parallel, the collimating lens being made of a single lens and having a refraction surface provided on one side and a diffraction surface provided on an opposite side, where a power of the diffraction surface is larger than a power of the refraction surface;
   a diaphragm to limit a luminosity of the lights converged on the collimating lens;
   a cylindrical lens to converge the linear ray components from the collimating lens, thereby creating a linear light in a main-scanning direction;
   a light deflector to deflect light from the cylindrical lens towards a photosensitive medium at a constant speed; and
   an f-θ lens to converge reflected ray of light from the light deflector onto the photosensitive medium, wherein the refraction surface and the diffraction surface have powers to satisfy the condition of:

$$-3 \leq \frac{K_d}{K_r} \leq -2$$

where K is the power of the diffraction surface, and $K_r$ is the power of the refraction surface.

* * * * *

UNITED STATES PATENT AND TRADEMARK OFFICE
CERTIFICATE OF CORRECTION

PATENT NO. : 7,245,411 B2 Page 1 of 1
APPLICATION NO. : 11/516511
DATED : July 17, 2007
INVENTOR(S) : Hyung-soo Kim It is certified that error appears in the above-identified patent and that said Letters Patent is hereby corrected as shown below:

Column 8, Line 35, change "Kis" to --$K_d$--.

Signed and Sealed this

Twenty-seventh Day of November, 2007

JON W. DUDAS
*Director of the United States Patent and Trademark Office*